Patented Feb. 2, 1943

2,309,908

UNITED STATES PATENT OFFICE 2,309,908

REDUCTION DRIVE MECHANISM

James W. Kinnucan, Detroit, Mich., assignor, by mesne assignments, to Continental Aviation and Engineering Corporation, a corporation of Virginia Original application September 1, 1939, Serial No. 293,098. Divided and this application February 8, 1940, Serial No. 317,908

8 Claims. (Cl. 184—6)

My invention relates to engines and more particularly to a reduction gear drive for engines or other similar power plants.

Much difficulty has been experienced in constructing reduction drives that are rugged enough to stand up in the present day high speed and high powered engines as employed today in aircraft. It is essential that these reduction drives be very compact and as light in weight as is possible consistent with sound engineering practice.

After many years of study of this most difficult problem, I have succeeded in constructing a rugged and efficient reduction gear drive that has effectively overcome the difficulties heretofore experienced with reduction drives more particularly incorporated with aircraft engines.

A further object of my present invention is to insure efficient performance of my improved heavy duty reduction gear drive by providing improved lubricating means that insures proper lubrication of all moving parts of the mechanism.

A still further object of my present invention is to provide a compact, rugged, light weight reduction gear drive adapted to be embodied in the present day high powered and high speed aeronautical engines which are more particularly designed for long life and for maintenance free service.

Figure 1:
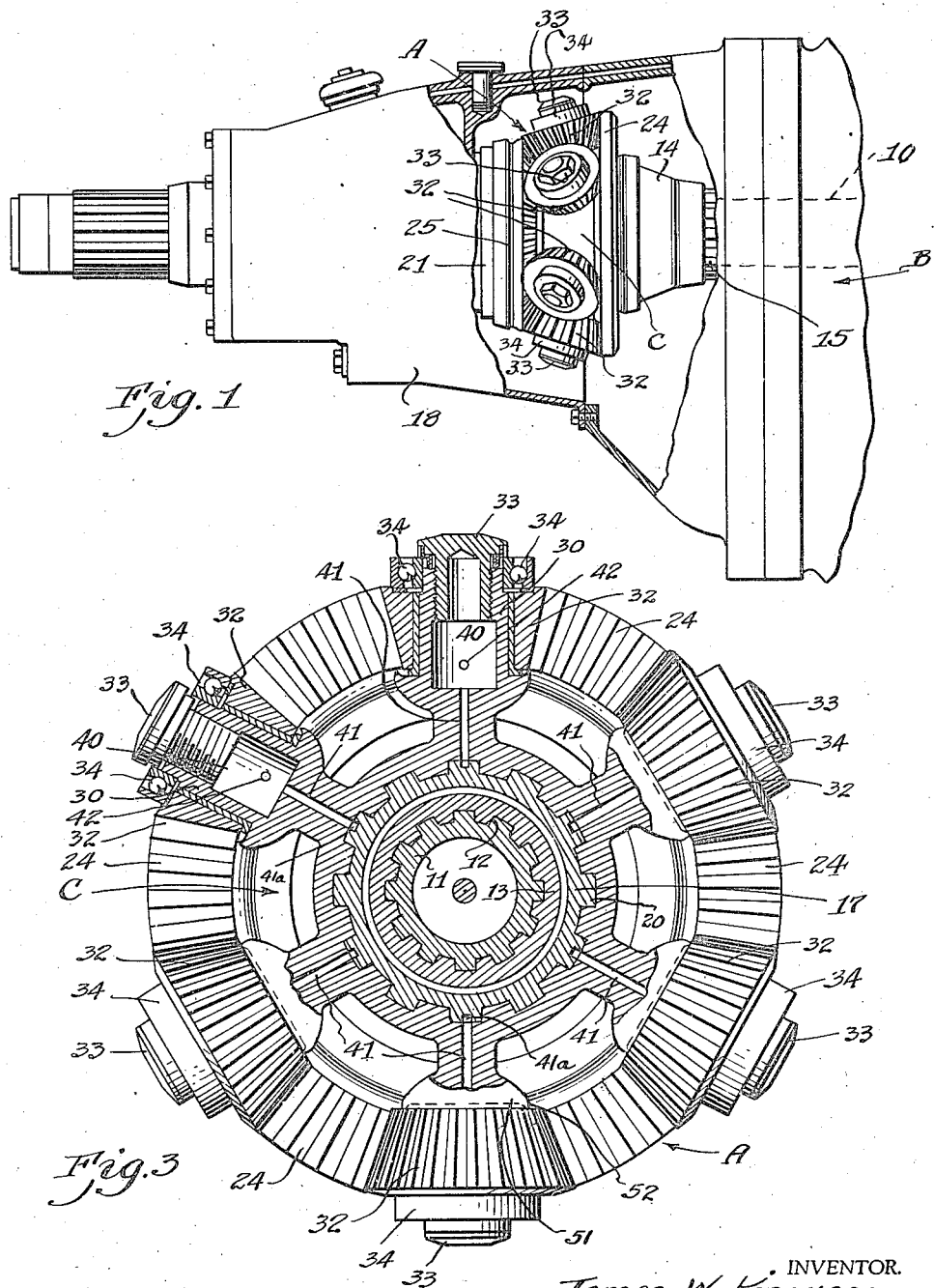
Figure 2:
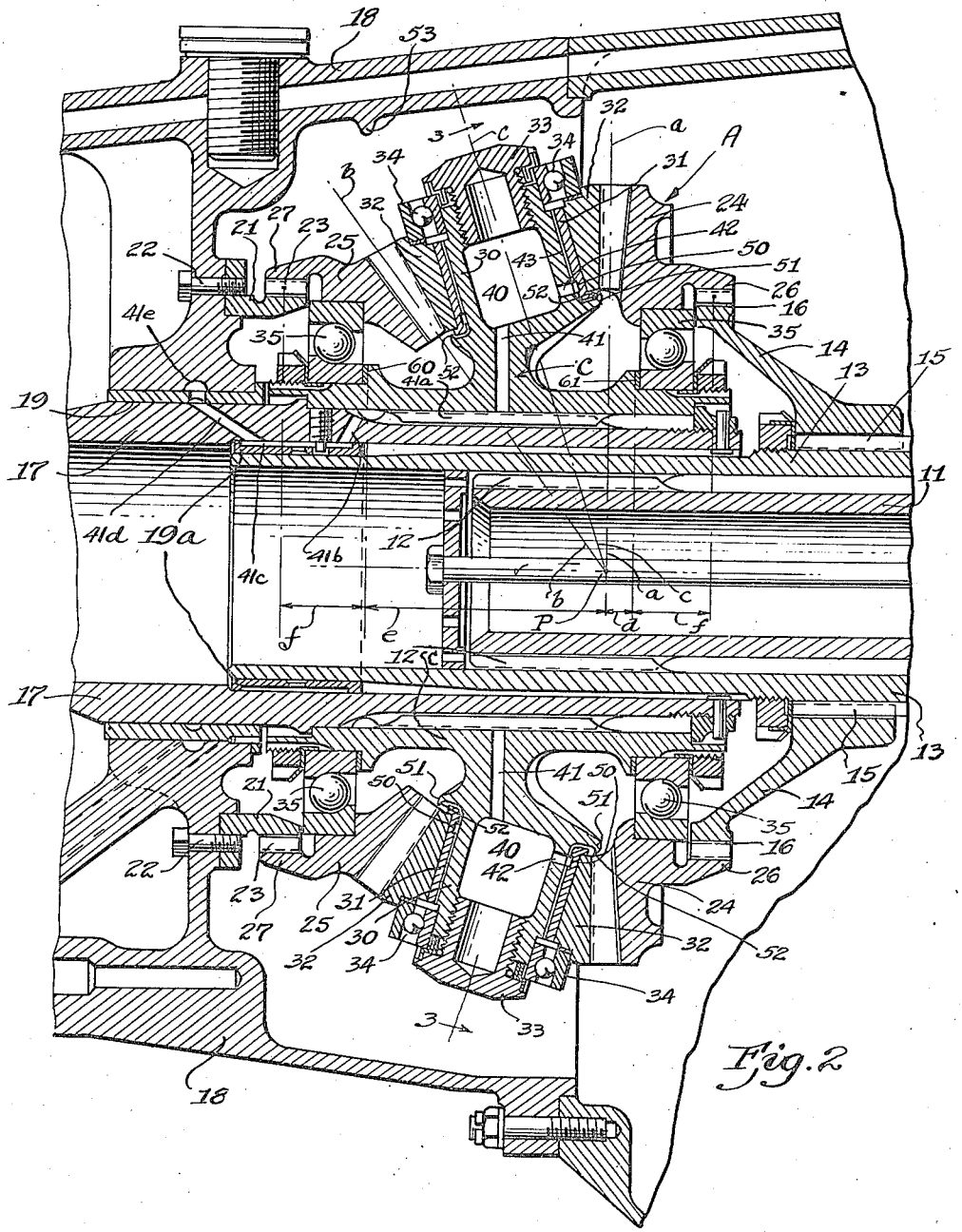
Figure 4:
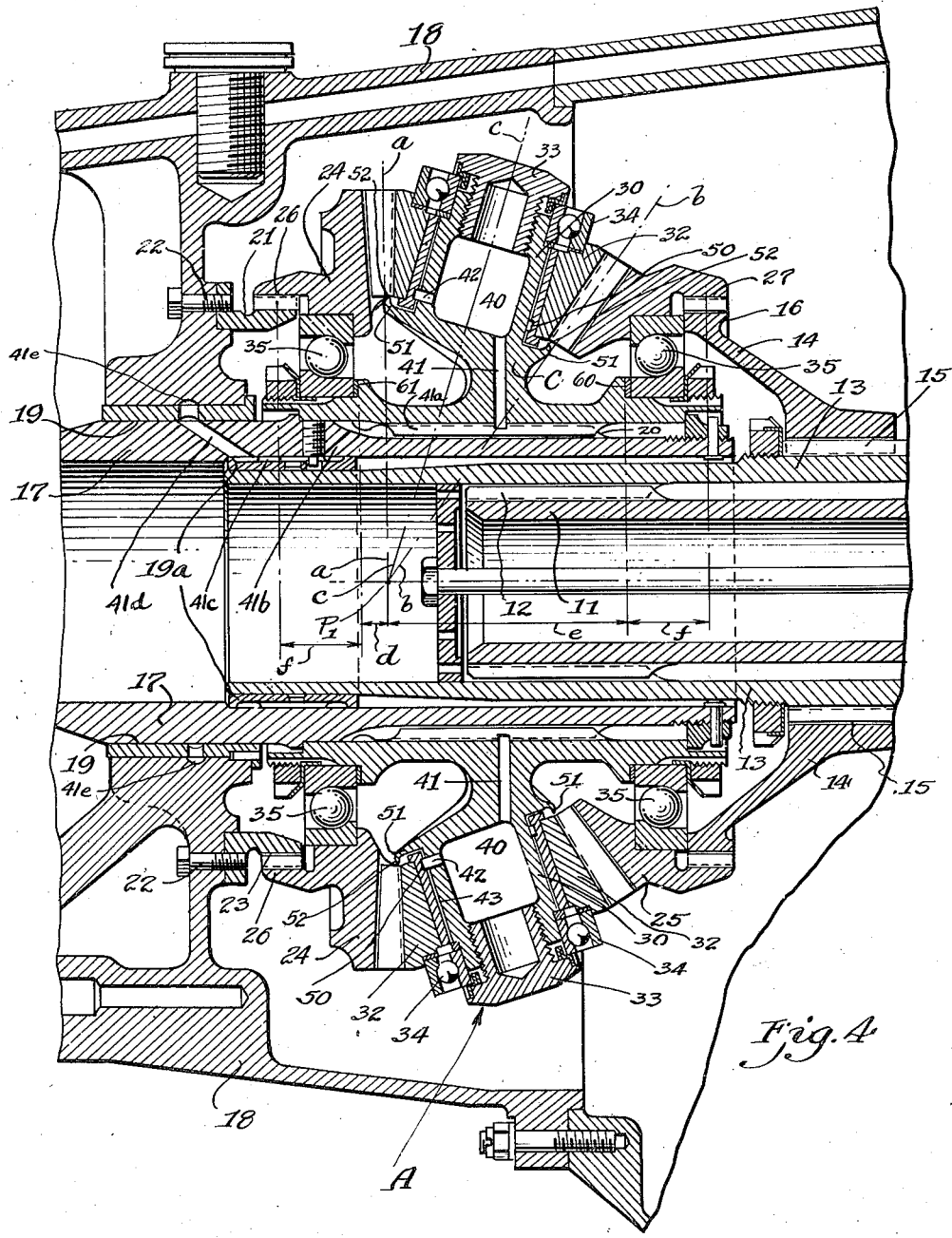
Figure 5:
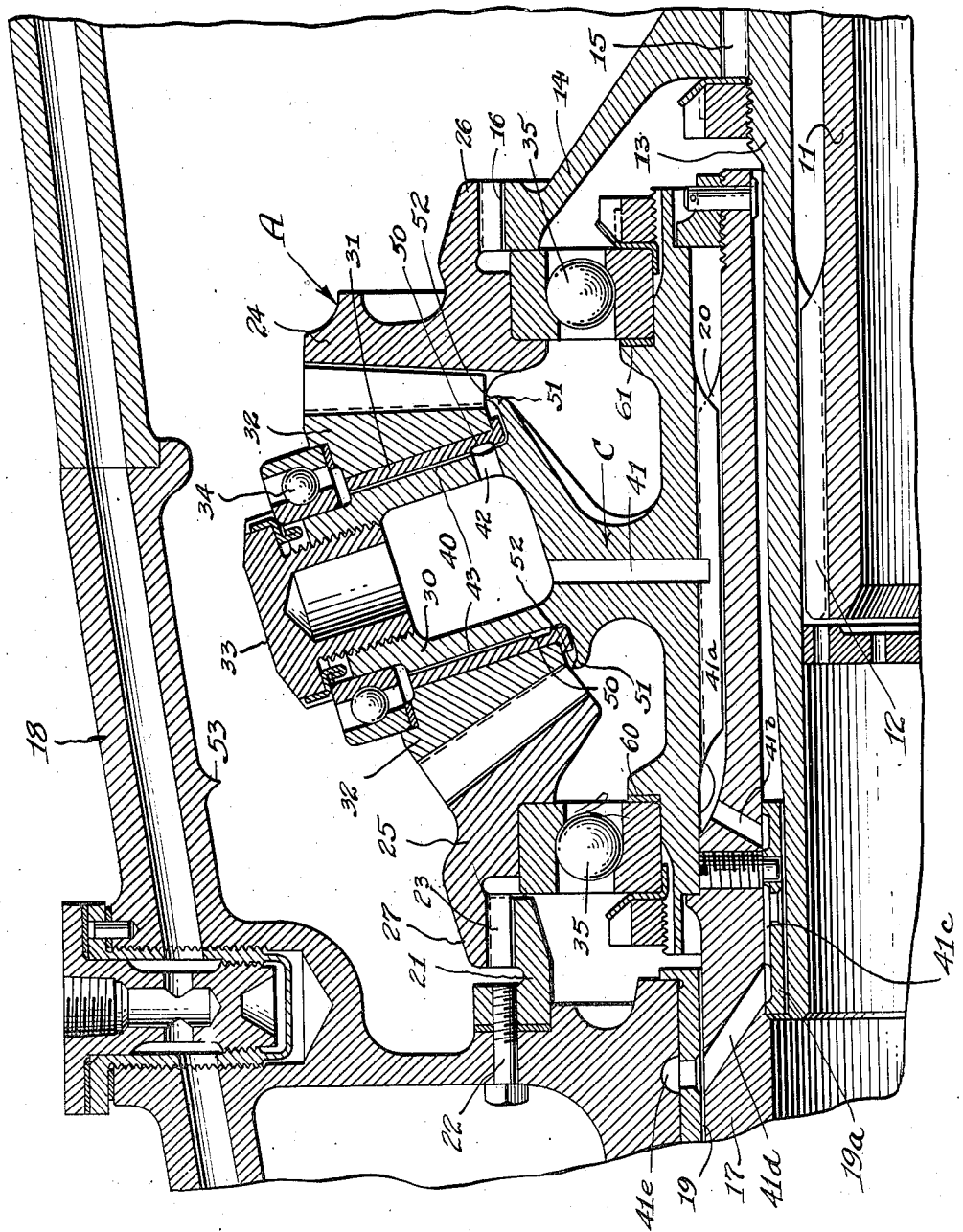

For a more detailed understanding of my invention, reference may be had to the accompanying drawings illustrating a preferred embodiment of my invention in which like characters refer to like parts throughout the several views, and in which:

Fig. 1 is an elevational view of the front end of an aeronautical engine, with a portion thereof being broken away to show my improved reduction gear drive in elevation, Fig. 2 is a longitudinal sectional view of the reduction gear drive and showing the structural relationship of the various cooperating parts of the mechanism, Fig. 3 is a transverse sectional view thereof taken substantially on the line 3—3 of Fig. 2, Fig. 4 is a longitudinal sectional view similar to Fig. 2, but showing my improved unitary reduction gear drive adjusted for a different speed reduction between the driving and driven members of the engine, and Fig. 5 is an enlarged fragmentary longitudinal sectional view of the reduction gear drive illustrated in Fig. 2.

The present application is a divisional application of my co-pending application for United States Letters Patent, Serial Number 293,098 filed September 1, 1939, now Patent No. 2,253,977.

I have selected for purposes of illustration to show my reduction gear drive, designated as a whole by the reference character A, with an internal combustion engine B having a crankshaft 10. The crankshaft is supported in a conventional manner and preferably includes a crankshaft extension 11, which is externally splined as at 12 to drivingly connect with an internally splined shaft or driving sleeve 13. A driving member 14 is splined to the sleeve 13 as at 15 and carries an externally splined portion 16 substantially adjacent the outer periphery thereof.

A driven member 17 is supported by suitable bearings in the nose of the gear case 18 and at its inner end is preferably supported by a bearing 19 carried in the case. Bearing 19a is a bearing or steady rest for sleeve 13. This driven member is externally splined as at 20 to engage complementary internal splines carried by the carrier C. A fixed ring 21 is secured to the gear case as at 22 or by other suitable securing means, and said ring is provided with an externally splined portion 23 of like construction to the externally splined portion 16 carried by the driving member 14. It will be noted that these external splines 23 and 16 are aligned and axially spaced, and are of the same pitch diameter.

My improved and novel reduction gear drive comprises in general the carrier C which is drivingly connected to the driven member 17 and other gearing as follows. A pair of axially spaced and aligned ring gear structures 24 and 25 (see Fig. 2) are connected in driving relation with the driving member 14 and fixed ring or support 21 respectively, these ring gears being preferably provided with the internal splines 26 and 27 respectively, which are complementary to the splines 16 and 23. Said splines 26 and 27 are identical and of the same pitch diameter and are constructed and arranged for selective engagement in driving relation with either of said splines 16 and 23.

The carrier C is provided with a plurality of radially extending integral spindles 30 (see Figs. 2, 3 and 4), and the axis of each spindle extends at an angle to a plane extending normal to the carrier axis, the inclination of each spindle being the same in each instance. A bearing sleeve 31 is fitted on each spindle and rotatably supports a beveled idler or intermediate gear 32, said intermediate gears being preferably secured on said spindles by retainer nuts 33 and suitable thrust bearings 34 in a conventional manner.

It will be noted that the ring gears 24 and 25 carry beveled gear teeth and these beveled ring gears are of different pitch diameter, the ring gear 24 being the larger of the two. The angle of these spindles are so designed that all the idler or intermediate gears carried thereby are constantly in mesh with both of said ring gears. Anti-friction bearings 35 are carried by the carrier C for rotatably supporting these ring gears, and it will thus be seen that the carrier, spindles, intermediate and ring gears form a unitary assembly.

In the operation of my reduction gear drive it will be noted the reduction is obtained through the ring gear 24 and idler or intermediate gears 32, which are caused to roll on the fixed gear 25 and thus rotate the carrier C and the driven member 17 drivingly connected with the said carrier.

The driving connection between the carrier C and the driven member 17 is so arranged as to permit an assembly of the unitary reduction gear drive end for end (see Fig. 4) which brings the ring gear 25 into driving relation with the driving member and the ring gear 24 into interlocking engagement with the fixed ring or support 21. The carrier is reversed end for end and likewise the spindles, so that the idler or intermediate gears still remain in mesh with the ring gears. In the particular proportions embodied in this construction, the arrangement illustrated in Fig. 2 provides a reduction from the driving to the driven members of 2.2 to 1 while that illustrated in Fig. 4 provides a reduction of 1.8 to 1. Obviously the proportions may be varied to suit various applications. The adjustment and varying of the reduction drive is had by reason of the symmetrical construction that permits the selective engagement of the driving member 14 with either ring gear.

The above described mechanism is particularly described and claimed in my co-pending application, Serial Number 293,098, filed September 1, 1939, and the present application relates to the lubrication of the idler or intermediate ring gear bearings. The spindle 30 is hollow as shown at 40 and a passage 41 in the carrier C connects this chamber 40 with the main engine lubrication system, and lubricant is fed into the chamber 40 which forms a lubricant reservoir from said main lubrication system by reason of the interconnecting passages 41a, 41b, 41c, 41d and 41e. A lateral passage 42 connects this reservoir with the annular groove 50 connecting with oil passage 43 carried in the sleeve bearing 31. This passage is preferably formed by the normal operating clearance between the sleeve 31 and spindle 30. The lubricant is induced to travel through the lateral passage 42 and outwardly through the passage 43 by centrifugal forces induced by the rotation of the carrier C. It will be noted that the passage 43 communicates with the reservoir at a point near the inner end of the reservoir and substantially adjacent the inner end of said sleeve bearing 31. Most of the lubricant is of course induced to flow radially outwardly to adequately lubricate the bearing surface. Some of the lubricant will seep inwardly along the sleeve bearing surface and thus the entire bearing surface is adequately lubricated at all times. The inclination of the spindles and the location of the communicating passage of port 42 co-operate to induce lubricant flow into the bearing under the influence of centrifugal forces.

It will be observed that the spindle 30 is provided with a cup-shaped flange and has a predetermined clearance with respect to the spindle and thus a predetermined quantity of lubricant is allowed to seep into the cupped recess formed by the flange 51. This flange 51 has an annular lip 52 and the lubricant in said cupped recess is caused to fly off this lip and is consequently directed to impinge directly onto the beveled gear 32 at the point of mesh with the ring gears, where lubrication is needed most. In fact the idler gears 32 are substantially drenched in oil while the engine is operating due to movement of the carrier C. The ring gears are lubricated at the points where they mesh with the idler gears. The above arrangement has resulted in the provision of a practical and successful reduction gear mechanism in which adequate lubrication is assured.

The gear case is preferably provided with a detent 53 positioned immediately above the stationary ring gear. The lubricating oil which is thrown off of the gearing tends to flow down the wall of the case and is collected on this detent and caused to drip directly on said stationary ring gear.

It will thus be noted that I have provided an efficient yet simple lubricating means especially suited to a reduction gear drive of the character described, and that the lubricating oil is caused to flow directly to the parts to be lubricated.

It will thus be observed that I have provided a construction which is compact and serviceable, and which employs a minimum of moving parts, so constructed and arranged as to be thoroughly lubricated at all times under various conditions of engine operation. My construction is readily assembled to an engine and may at any time be readily serviced if necessary with a minimum of cost. The drive is readily reversed and is thus adaptable for use with various types of engines.

Referring more particularly to Figs. 2 and 4 illustrating respectively the two portions of the gearing, it will be noted that the carrier C is turned end for end. The relationship of the shoulders 60 and 61 carried by the carrier C and arranged to abut the anti-friction bearings 35, with the center lines of the spindles and pitch axis of the ring gears is very important. The line a extending along the pitch line of the gear teeth of ring gear 24 intersects a similar line b extending along the pitch line of the gear teeth of ring gear 25 at a point P in Fig. 2 and P1 in Fig. 4. The center line or axis c of each of the idler gears 32 also intersects these lines a and b at point P in Fig. 2 and P1 in Fig. 4 on the carrier axis. The axial distance between shoulders 60 and 61 is represented in Figs. 2 and 4 by the line (d plus e), in which d in both instances represents the axial distance from shoulder 61 to the intersection of lines a, b and c while e in both instances represents the axial distance from shoulder 60 to the intersection of lines a, b and c.

It will be noted that the distances d and e are the same in both Figs. 2 and 4. The above relationship must always hold true if the carrier C is to be allowed to be turned end for end as herein illustrated, and the shoulders 60 and 61 bear a fixed relation with respect to the fixed ring 21 and driving member 14 at either position, that is, shoulder 60 (Fig. 2) is axially spaced a distance $f$ from the center of gear 23 and shoulder 61 is spaced the same distance $f$ from gear 16. Thus on reversal of the carrier C as in Fig. 4, it will be noted that shoulder 60 is spaced a distance $f$ from gear 16 while shoulder 61 is spaced a like distance $f$ from gear 21.

It will be apparent that the lubricating system herein described is applicable to either assembly of the mechanism as illustrated in Figs. 2 and 4, the lubricant conduits being so constructed and arranged as to function to convey the lubricant to the parts to be lubricated without the addition or rearrangement of any oil ducts or connections.

Although I have illustrated but one form of my invention and disclosed but one adaptation thereof, it will be readily apparent that same may be embodied in other applications and modified as to construction without departing from the principles of my invention or from the spirit of the claims appended hereto.

I claim:

1. A lubrication system for a gear reduction drive including driving and driven members, gear reduction mechanism including a pair of ring gears, a fixed support, one of said ring gears secured to the fixed support and the other drivingly connected to the driving member, a carrier drivingly connected with the driven member and provided with a plurality of spindles, an idler gear and a bearing therefor rotatably mounting same on each of said spindles, each of said spindles having an annular trough located substantially concentric with and adjacent to the inner end face of said idler gears, and comprising means for feeding a lubricant to the spindle to lubricate the idler gear bearing and to said annular trough, and means for discharging the lubricant from said trough directly onto the teeth of said idler gear during engine operation.

2. A lubrication system for a gear reduction drive including driving and driven members, gear reduction mechanism including a pair of ring gears, a fixed support, one of said ring gears secured to the fixed support and the other drivingly connected to the driving member, a carrier drivingly connected with the driven member and provided with a plurality of spindles, an idler gear and a bearing therefor rotatably mounting same on each of said spindles, each of said spindles having an annular trough located substantially concentric with and adjacent to the inner end face of said idler gears, and comprising means for feeding a lubricant to the spindle to lubricate the idler gear bearing, said bearing having a predetermined operating clearance with respect to the spindle to permit seepage of the lubricant from said bearing to said annular trough, and means for discharging the lubricant from said trough directly onto the teeth of said idler gear during engine operation.

3. A lubrication system for a gear reduction drive including driving and driven members, gear reduction mechanism including a pair of ring gears, a fixed support, one of said ring gears secured to the fixed support and the other drivingly connected to the driving member, a carrier drivingly connected with the driven member and provided with a plurality of spindles, an idler gear and a bearing therefor rotatably mounting same on each of said spindles, each of said spindles having an annular trough located substantially concentric with and adjacent to the inner end face of said idler gears, and comprising means for feeding a lubricant to the spindle to lubricate the idler gear bearing said bearing having a predetermined operating clearance with respect to the spindle to permit seepage of the lubricant from said bearing to said annular trough, and means responsive to centrifugal forces induced by rotation of the carrier for discharging the lubricant from said trough directly onto the teeth of said idler gear during engine operation.

4. A lubrication system for a gear reduction drive including driving and driven members, gear reduction mechanism including a pair of ring gears, a fixed support, one of said ring gears secured to the fixed support and the other drivingly connected to the driving member, a carrier drivingly connected with the driven member and provided with a plurality of spindles, an idler gear and a bearing therefor rotatably mounting same on each of said spindles, each of said spindles having an annular trough located substantially concentric with and adjacent to the inner end face of said idler gears, and comprising means for feeding a lubricant to the spindle to lubricate the idler gear bearing, said bearing having a predetermined operating clearance with respect to the spindle to permit seepage of the lubricant from said bearing to said annular trough, said trough having a peripheral lip located substantially in alignment with the idler gear teeth whereby to direct said lubricant onto said idler gear teeth during engine operation as said lubricant is discharged from said trough by the centrifugal forces induced by rotation of the carrier.

5. A lubrication system for a reduction gear drive comprising a planetary gear mechanism including a one-piece integral intermediate gear supporting carrier structure having a hub portion and a plurality of gear supporting spindles extending radially from said hub portion, each spindle having an integral flange forming an annular trough encircling the spindle substantially adjacent the base of the spindle, and comprising a structure provided with lubricating oil passages constructed and arranged for conducting a lubricating oil to said annular trough.

6. A lubrication system for a reduction gear drive of the planetary type including beveled ring gears and one or more intermediate idler gears meshing with said ring gears, and comprising a rotatably supported carrier structure rotatably supporting said intermediate idler gears and including an idler gear spindle having an annular lubricant trough adjacent the base of said spindle, said trough provided with an annular lip portion adjacent the inner end of the idler gear teeth, and means for feeding lubricating oil to said annular trough.

7. A lubrication system for a reduction gear drive of the planetary type including beveled ring gears and a revolving carrier provided with radially extending spindles, idler gears rotatably supported by said spindles in meshing engagement with said ring gears, and comprising a lubricant reservoir within each of said spindles, means for supplying lubricating oil to said reservoirs, and conducting means conducting lubricating oil from said reservoirs direct to the beveled teeth of said idler gears, and including an annular trough located at the base of each spindle and lubricant passages connecting said trough with said associated reservoir.

8. A lubrication system for a reduction gear drive of the planetary type including beveled ring gears and a revolving carrier provided with radially extending spindles, idler gears rotatably supported by said spindles in meshing engagement with said ring gears, and comprising a lubricant reservoir within each of said spindles, means for supplying lubricating oil to said reservoirs, and conducting means conducting lubricating oil from said reservoirs direct to the beveled teeth of said idler gears, and including an annular trough located at the base of each spindle and lubricant passages connecting said trough with said associated reservoir, said trough provided with an annular lip substantially at its peripheral edge and in juxtaposition to the inner end portion of said beveled idler gear teeth.

JAMES W. KINNUCAN.